UNITED STATES PATENT OFFICE.

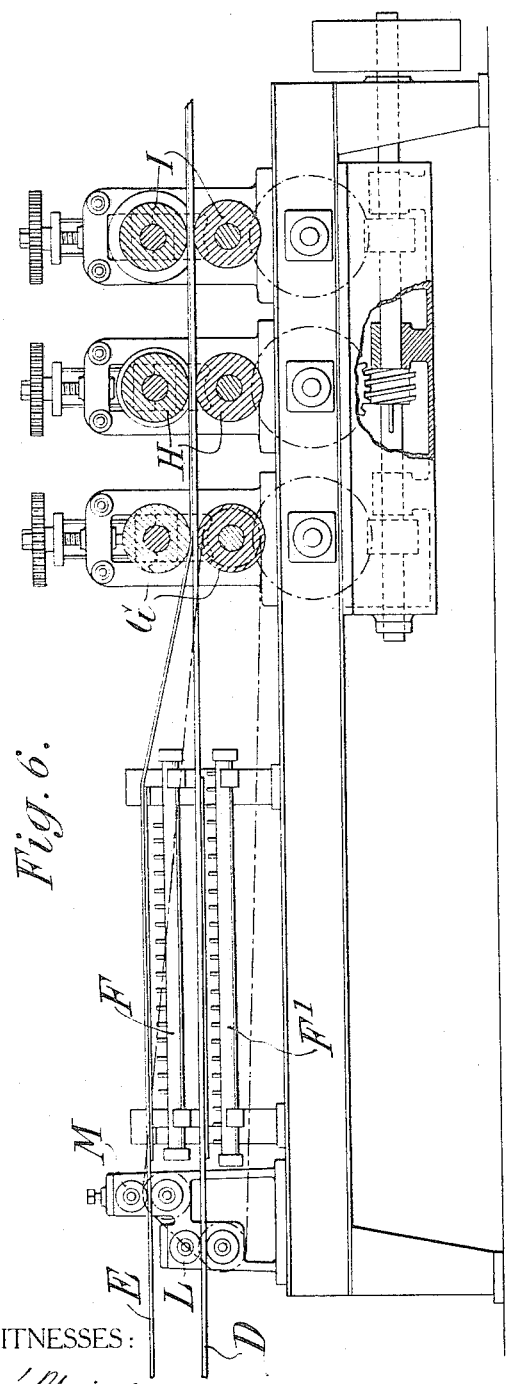
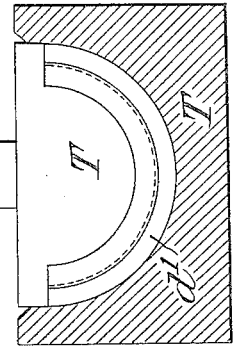
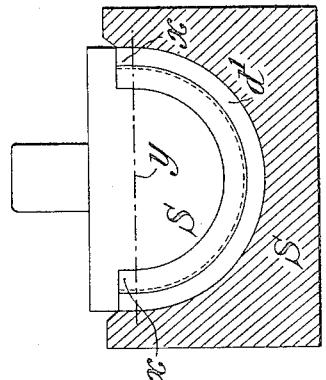
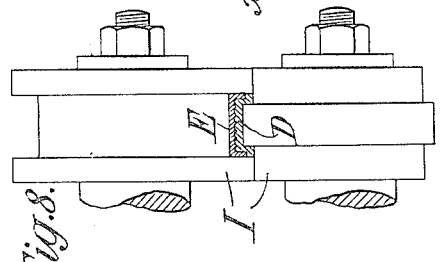
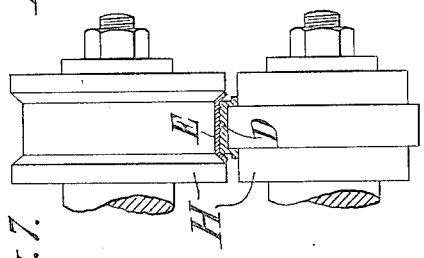

WILLIAM KLOCKE, OF NEW YORK, N. Y., ASSIGNOR TO PRESSED BEARING COMPANY, INC., OF BROOKLYN, NEW YORK, A CORPORATION OF NEW YORK.

PROCESS OF MAKING LINED BEARINGS.

1,302,564.   Specification of Letters Patent.   Patented May 6, 1919.

Application filed July 21, 1917. Serial No. 182,066.

*To all whom it may concern:*

Be it known that I, WILLIAM KLOCKE, a citizen of the United States of America, residing in Woodhaven, in the borough of Queens, county of Queens, city and State of New York, have invented certain new and useful Improvements in Processes of Making Lined Bearings, of which the following is a specification.

This invention relates to processes of making lined bearings and aims to provide improvements therein, more especially being an improvement upon the lined bearing and processes of making the same heretofore described in my United States Patent No. 1,180,728, dated April 25, 1916, and in my United States application Serial No. 100,874, filed May 31, 1916.

In carrying out the present process, a sheet or strip of backing material has applied thereto lining material, as, for example, Babbitt metal. The lining material may be applied by floating it on, as in my Patent No. 1,180,728, or may be applied in the form of a strip, as in my application Serial No. 100,874. The backing sheet or strip is preferably provided with a side flange, and in pressing the bearing to semi-cylindrical shape, there is a drawing of the metal, especially the flanges, which drawing renders the material at the ends of the flanges somewhat more narrow than that in the middle. According to the present invention, the bearing, after being shaped to approximately semi-cylindrical form, and having the lining material either densified or not, is subjected to a pressure to fill out the undersized portions of the bearing to true size and shape. The pressure also densifies, or additionally densifies, the lining material and renders the bearing properly sized and shaped, and renders the lining material dense and well shaped.

An embodiment of the lined bearing and an example of the process of making the same will be more fully described in connection with the accompanying drawings, wherein—

Fig. 6 is an elevation (with parts in section) of a machine for carrying out the preferred method of forming the composite sheet from which the half bearings are formed;

Figs. 7 and 8 are views of rolls, illustrating a method of forming facings of lining metal upon the sides of the strip from which the half bearings are formed;

Fig. 9 is a view of a pair of dies illustrating diagrammatically the formation of the sheet or strip of the composite material into approximately semi-cylindrical form. The semi-cylindrical blank or bearing is shown as having extra metal at its ends to fill out the undersized parts of the bearing under pressure to be applied thereto;

Fig. 10 is a view similar to Fig. 9, showing the half bearing as pressed between the dies to its final dimensions and accurate shape.

Figure 1:
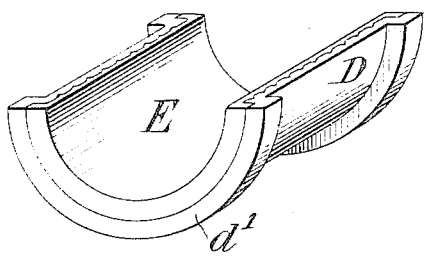
Figure 1 is a perspective view of a lined half bearing.
Figure 2:
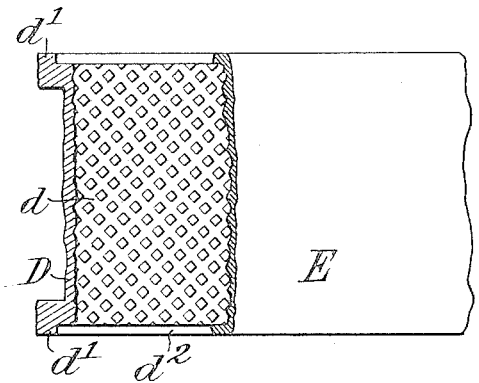
Fig. 2 is a plan view, partially in broken section, of a sheet or strip from which the bearing is formed.
Figure 3:
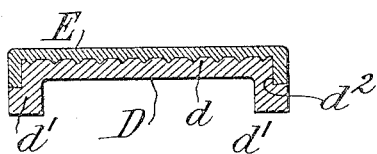
Fig. 3 is a cross-section of the sheet or strip shown in Fig. 2.

In carrying out the present process a composite sheet or strip of backing material and lining material is formed. This strip may be formed as in my Patent No. 1,180,728, or, as is preferred, as in my said application Serial No. 100,874. The preferred method of forming the strip is illustrated in Fig. 6. As therein shown, a backing strip D and a strip of lining material, as Babbitt metal, E, are passed over heaters, as F F', being fed by pairs of feed rolls L and M respectively. The backing strip D preferably has indentations or anchorages $d$ therein (Figs. 2 and 3) and preferably has solder applied to its indented face. The heated backing strip D and the heated strip E of lining material are brought together between a pair of rolls G, which rolls act to press the strips securely together, so that material of the strip of lining material enters the anchorages or depressions in the face of the backing strip D, and the solder also fluxes together the backing strip and strip of lining material. The rolls G may also act to densify the lining material.

The backing strip D is also preferably formed with a side flange $d'$ at each side thereof, and also with a recess $d^2$ in the face side of the flange, which recess is filled with lining material, so as to face, or partially face, the sides of the bearing.

Figure 4:
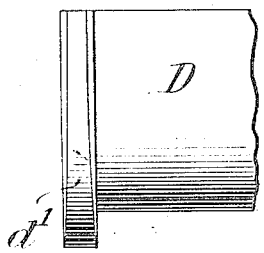
Fig. 4 is a view in partial elevation, illustrating (exaggerated) the drawing effect upon the side flanges, of the die in pressing the half bearing from a sheet or strip to semi-cylindrical form.
Figure 5:
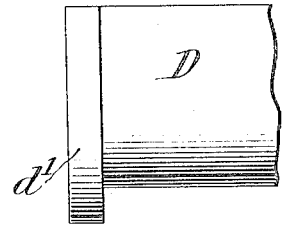
Fig. 5 is a view similar to Fig. 4, showing the metal of the bearing filled out by pressure applied to the same, and the bearing of full dimensions and true shape.

The filling of the recesses in the sides of the strip is preferably accomplished by means of pairs of rollers H and I, Figs. 4 and 5. The strip of lining material may either be made wider than the backing strip, or the strip of lining material may be pressed by the rolls G so as to flow laterally beyond the edges of the backing strip D. The rollers H (Fig. 7) act to partially turn the laterally projecting portions of the strip of lining material into the recesses $d^2$ of the backing strip, and the rollers I complete the filling of the lining material into the recesses $d^2$.

A section of the composite strip thus formed, of suitable length, is then preferably pressed between a pair of dies S to roughly semi-cylindrical shape, being thus an approximation to its final form and dimensions. In pressing the strip to such semi-cylindrical shape there is usually a drawing action upon the metal, especially in the case where the strip has side flanges $d'$, the effect of this drawing action, being illustrated, in exaggerated form, in Fig. 4. The pair of dies S may be operated, or not, so as to densify, or additionally densify, the lining material.

The length of the strip which is acted upon by the dies S is preferably so chosen that excess portions $x$ are left at the ends of the strip. The extra height of the end portion is illustrated by the dotted line $y$.

To complete the bearing, the semi-cylindrical strip with the excess portions $x$ is placed between a pair of dies T which press upon the upturned ends of the strip and force the excess metal $x$ to flow and fill out the under-sized portions of the bearing. The pressure is preferably considerable so that wherever there is a part of the bearing which is undersized, the metal will flow to fill out all parts of the bearing to full dimensions. Fig. 5 illustrates a bearing having its undersized portions filled out as described.

The dies T also act to densify the lining metal. The surface of the lining metal will be very dense and of very accurate and true shape.

Variations in the example of the process herein illustrated and specifically described may be made without departing from the essential nature of the invention. The bearing specifically illustrated and described may also be otherwise shaped or constructed.

It is to be understood that the final product of the improved method is a lined half-bearing having preferably end flanges as usual, and being of semi-cylindrical form but not necessarily of the precise dimensions of a semi-cylinder; that is to say, it may be a full semi-cylinder so that two united half bearings form a complete cylindrical bearing; or it may, as is the more usual practice, be somewhat less than a full semi-cylinder, so that to form a complete bearing two half-bearings are put together with shims interposed, so that these can be reduced or withdrawn as wear occurs. The essential feature of the method, broadly stated, is that the half bearing is first shaped to an approximation to its final form, although somewhat larger, and is finally reduced by pressure to its precise final form and dimensions. More specifically, it is first formed with its sides at $x$ projecting somewhat beyond the final dimensions, and is finally brought to true shape by forcing in these projecting portions and thereby causing such a flow of the metal as to fill out all parts of the bearing into precise conformity with the shaping dies.

What I claim is:—

1. A method of forming a lined half-bearing consisting in uniting a face of lining metal to a base of backing metal, bending the composite blank to semi-cylindrical form, and subjecting it while in a die having the contour of the finished product to final pressure sufficient to cause it to fill such die and bring its exterior out to its final shape.

2. A method of forming a lined half-bearing consisting in uniting a face of lining metal to a base of backing metal, bending the composite blank to semi-cylindrical form, and subjecting it while in a die having the contour of the finished product to final pressure in direction perpendicular to the axis of the bearing and perpendicular to the meeting faces of the half-bearings, sufficient to cause it to fill such die and bring its exterior out to its final shape.

3. A method of forming a lined half-bearing consisting in uniting a face of lining metal to a base of backing metal, the latter having lateral flanges, bending the composite blank to semi-cylindrical form, with such flanges on its exterior, and subjecting it while in a die having the contour of the finished product to final pressure sufficient to cause it to fill such die and bring its exterior out to its final shape.

4. A method of forming a lined half-bearing consisting in uniting a face of lining metal to a base of backing metal, the latter having lateral flanges, bending the composite blank to semi-cylindrical form, with such flanges on its exterior, and subjecting it while in a die having the contour of the finished product to final pressure in direction perpendicular to the axis of the bearing and perpendicular to the meeting faces of the half-bearings, sufficient to cause it to fill such die and bring its exterior out to its final shape.

5. A method of forming a lined half-bearing consisting in uniting a face of lining metal to a base of backing metal, the latter having lateral flanges, turning portions of the lining metal over said flanges to form a facing thereon, bending the composite blank to semi-cylindrical form, with such flanges on its exterior, and subjecting it while in a die having the contour of the finished product to final pressure sufficient to cause it to fill such die and bring its exterior out to its final shape.

6. A method of forming a semi-cylindrical lined half-bearing comprising uniting lining metal to a sheet of backing metal, forming the composite sheet into approximately its final shape but with its sides projecting beyond a true semi-cylinder, and pressing the blank to reduce such projecting sides and bring the bearing to semi-cylindrical form.

In witness whereof I have hereunto signed my name.

WILLIAM KLOCKE.